US012481142B2

(12) United States Patent
Morimoto et al.

(10) Patent No.: US 12,481,142 B2
(45) Date of Patent: Nov. 25, 2025

(54) PHOTOELECTRON EMISSION MICROSCOPE

(71) Applicant: Hitachi High-Tech Corporation, Tokyo (JP)

(72) Inventors: Takeshi Morimoto, Tokyo (JP); Momoyo Enyama, Tokyo (JP); Akira Ikegami, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 501 days.

(21) Appl. No.: 18/097,554

(22) Filed: Jan. 17, 2023

(65) Prior Publication Data

US 2023/0305281 A1 Sep. 28, 2023

(30) Foreign Application Priority Data

Mar. 22, 2022 (JP) ................. 2022-045583

(51) Int. Cl.
*G02B 21/00* (2006.01)
*G02B 21/36* (2006.01)

(52) U.S. Cl.
CPC ..... *G02B 21/0076* (2013.01); *G02B 21/0072* (2013.01); *G02B 21/361* (2013.01)

(58) Field of Classification Search
CPC ............ G02B 21/0076; G02B 21/0072; G02B 21/361; G02B 21/365; G02B 21/06; G02B 21/26
See application file for complete search history.

(56) References Cited

U.S. PATENT DOCUMENTS

| 2003/0111601 | A1 | 6/2003 | Adler et al. |
| 2009/0032693 | A1* | 2/2009 | Kakuta ............... H01J 37/1471 250/311 |
| 2011/0284759 | A1 | 11/2011 | Kono et al. |

FOREIGN PATENT DOCUMENTS

| JP | 2009-54575 A | 3/2009 |
| JP | 4413618 B2 | 2/2010 |
| JP | 2010-182424 A | 8/2010 |

OTHER PUBLICATIONS

Korean Office Action received in corresponding Korean Application No. 10-2023-0017818 dated Jan. 8, 2025.

* cited by examiner

*Primary Examiner* — Angela M. Medich
(74) *Attorney, Agent, or Firm* — MATTINGLY & MALUR, PC

(57) ABSTRACT

A photoelectron emission microscope reducing preparation time for capturing a photoelectron image with high luminance and resolution. The photoelectron emission microscope includes: a sample stage on which a sample is to be placed; an excitation light source configured to irradiate the sample with excitation light; a camera configured to detect photoelectrons emitted from the sample and capture a photoelectron image; an objective lens configured to focus the photoelectrons on a detection surface of the camera; and a control unit configured to control each unit, in which the control unit aligns, based on a luminance distribution of a first photoelectron image, a field-of-view center of the camera with an irradiation position of the excitation light, and aligns, based on a second photoelectron image and a third photoelectron image that are captured by changing a lens intensity of the objective lens, the field-of-view center with a central axis of the objective lens.

11 Claims, 17 Drawing Sheets

[FIG. 1]
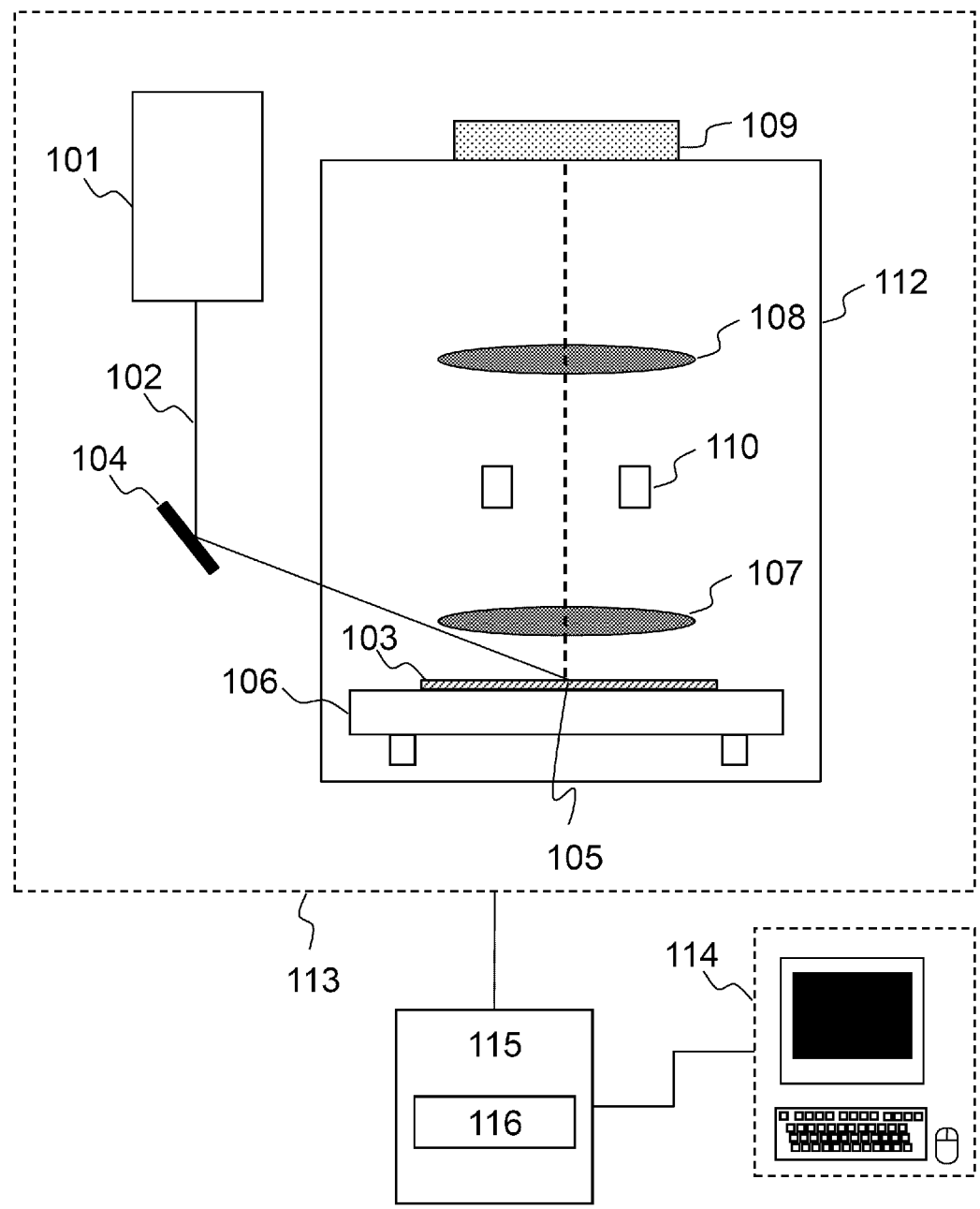

[FIG. 2A]
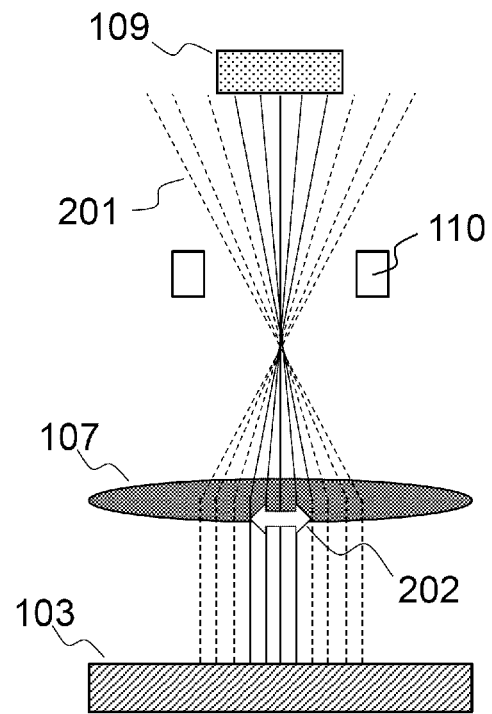
[FIG. 2B]
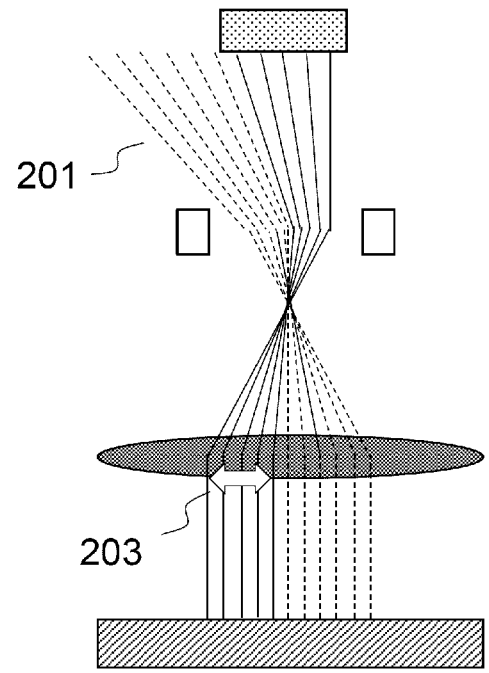

[FIG. 3A]
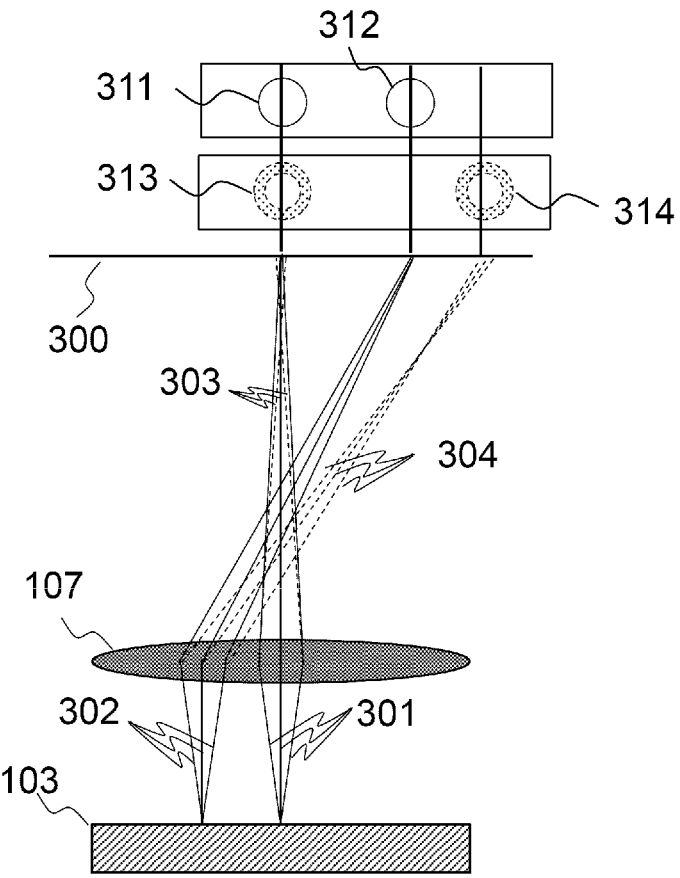
[FIG. 3B]
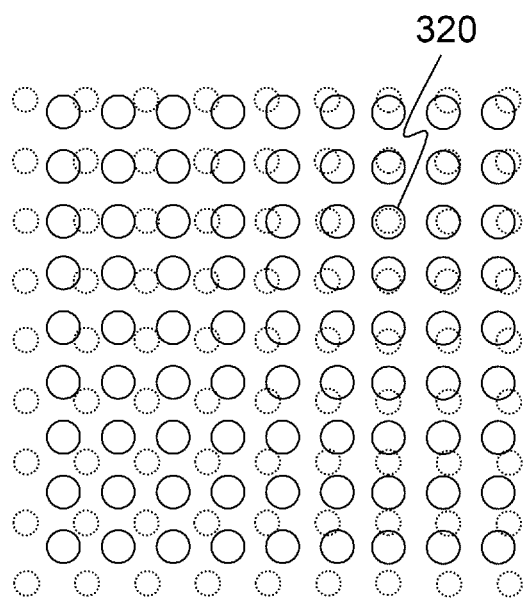

[FIG. 4A]
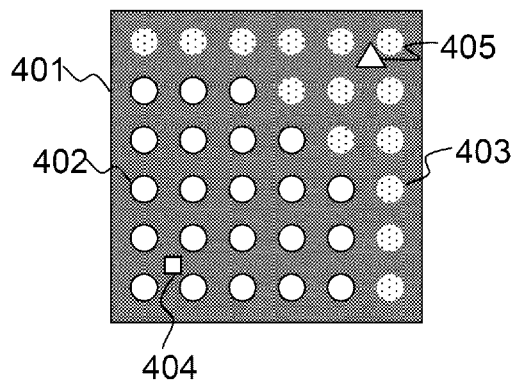
[FIG. 4B]
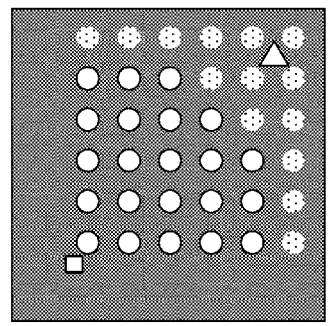
[FIG. 4C]
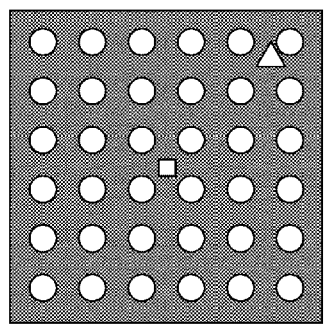
[FIG. 4D]
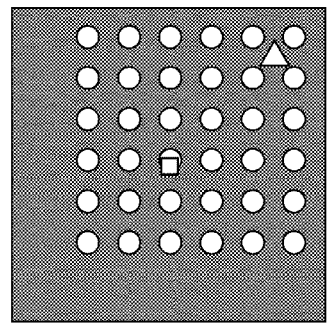
[FIG. 4E]
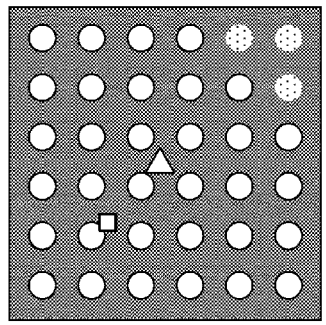
[FIG. 4F]
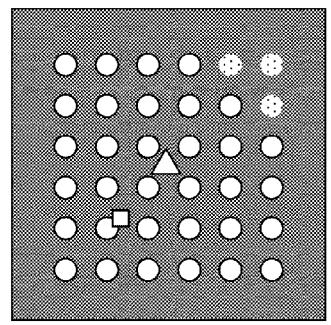
[FIG. 4G]
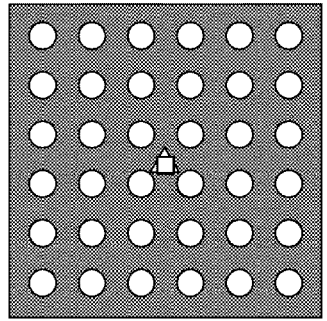
[FIG. 4H]
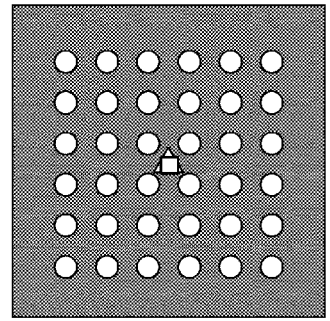

[FIG. 5]
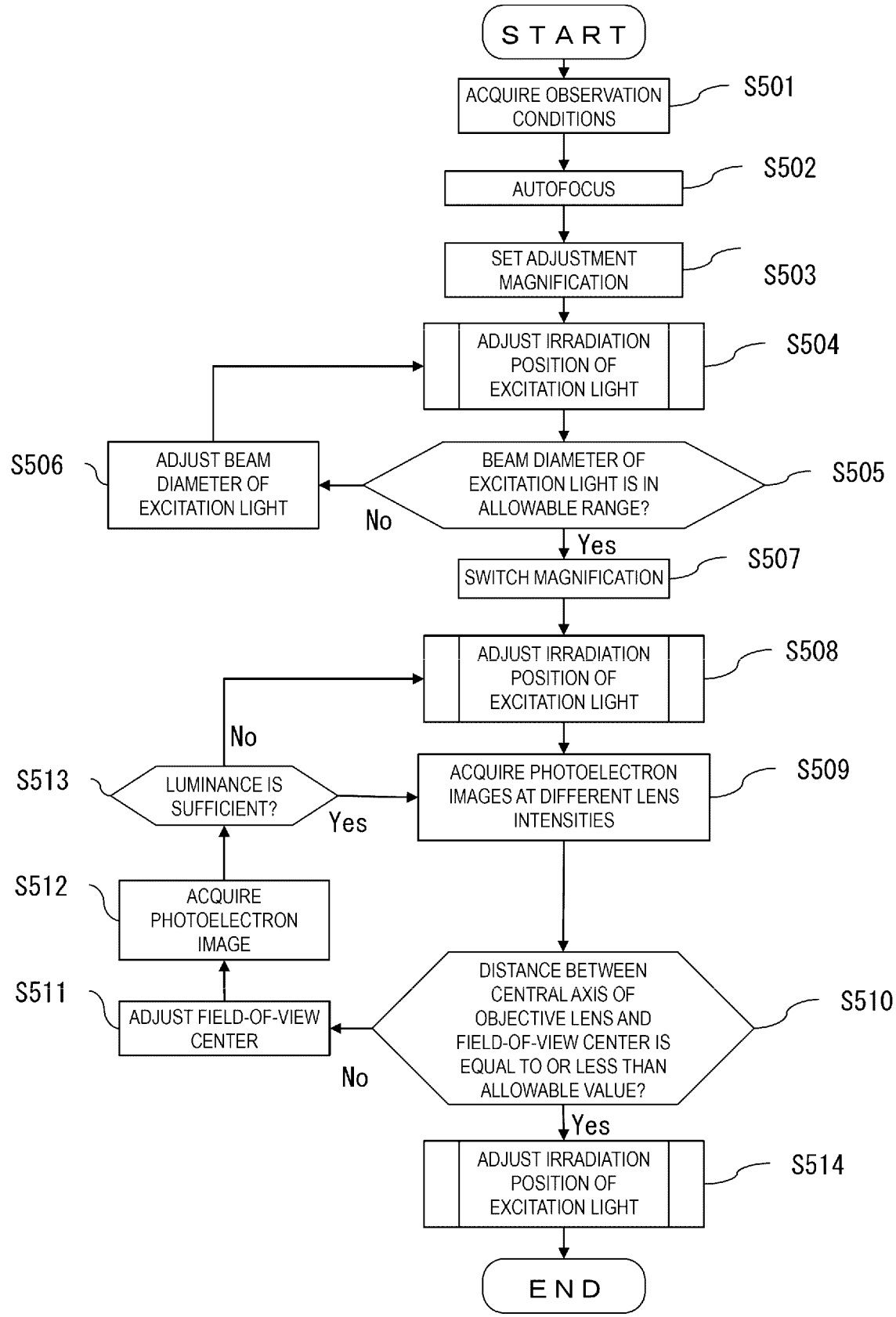

[FIG. 6]
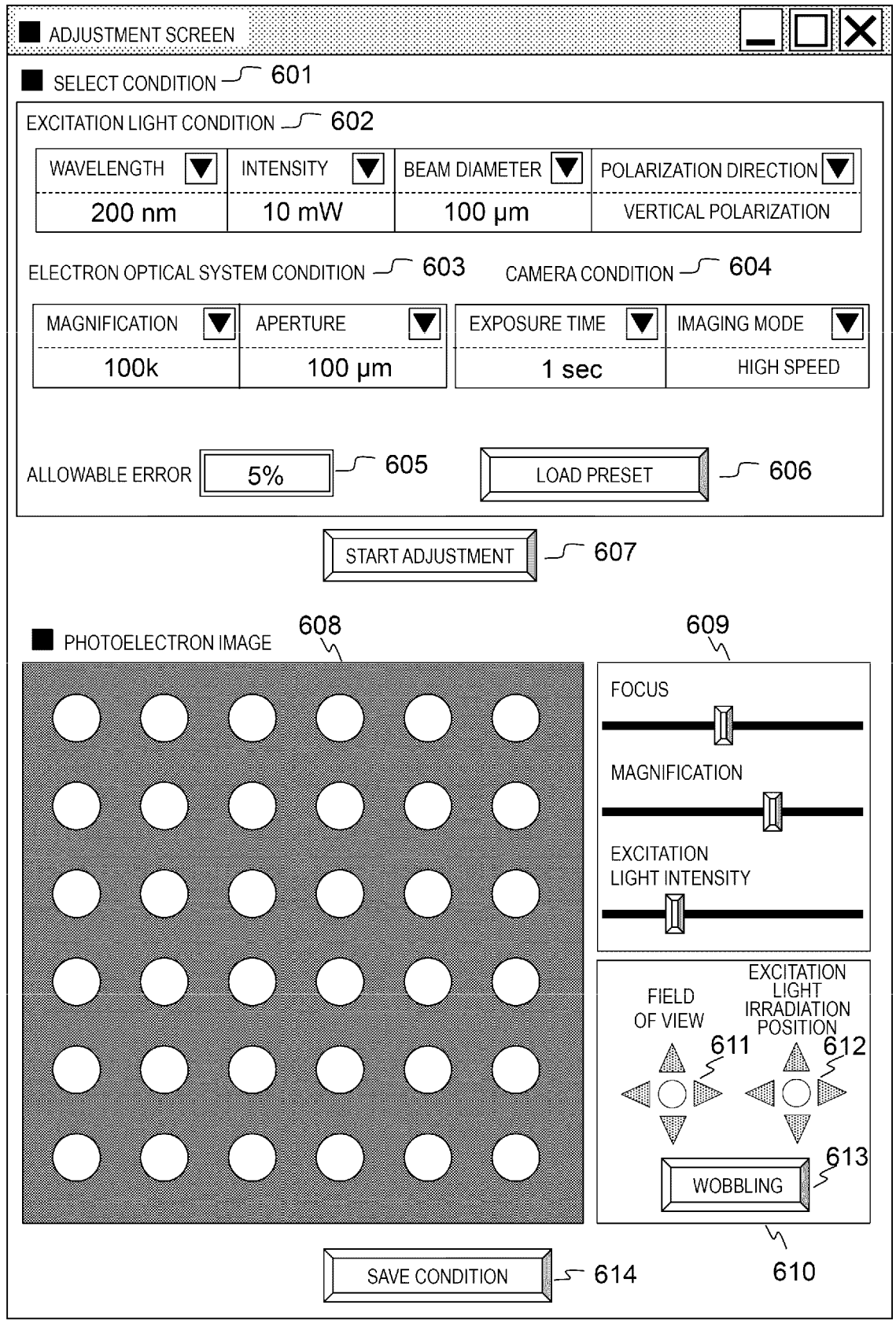

[FIG. 7]
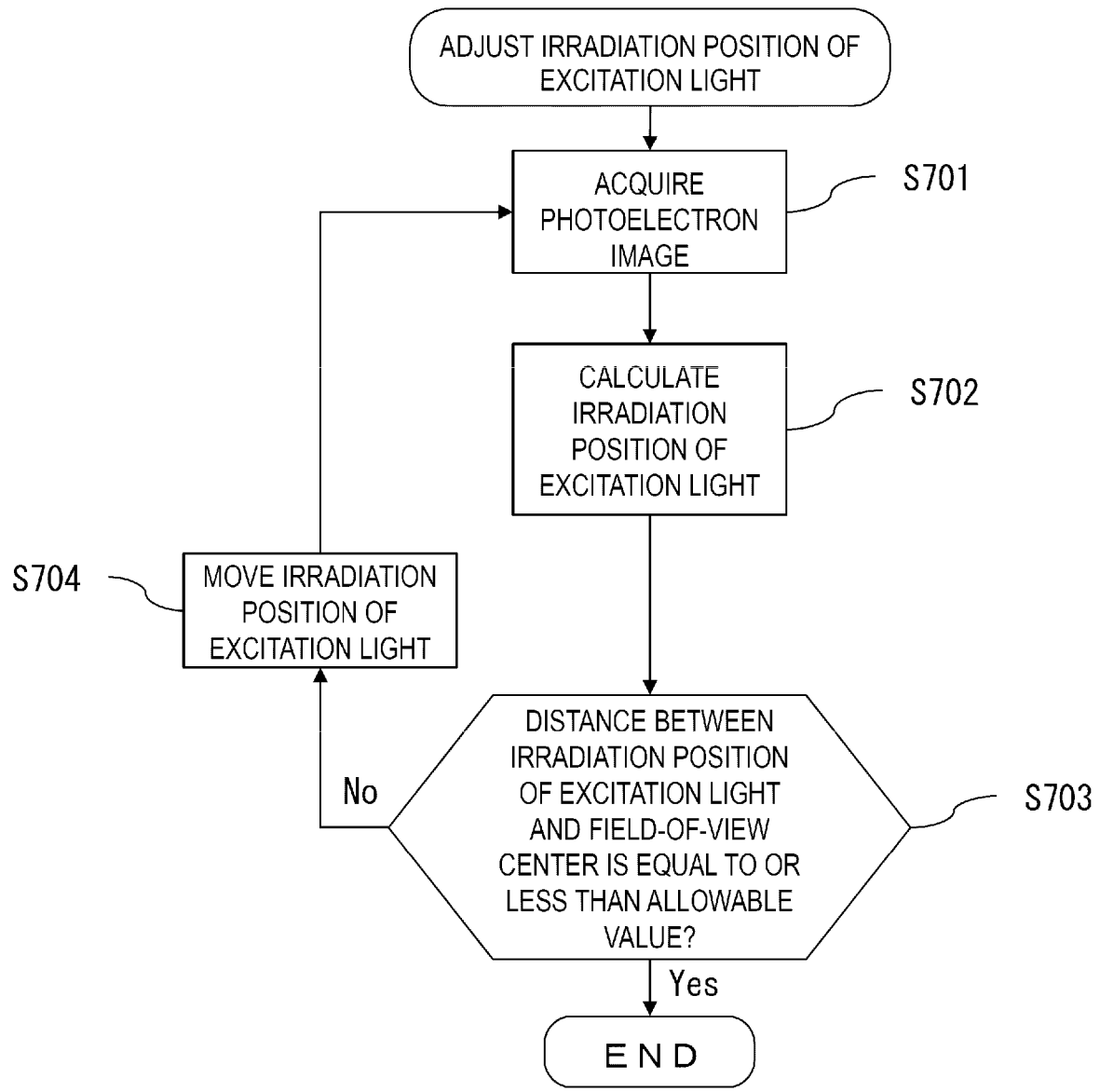

[FIG. 8]
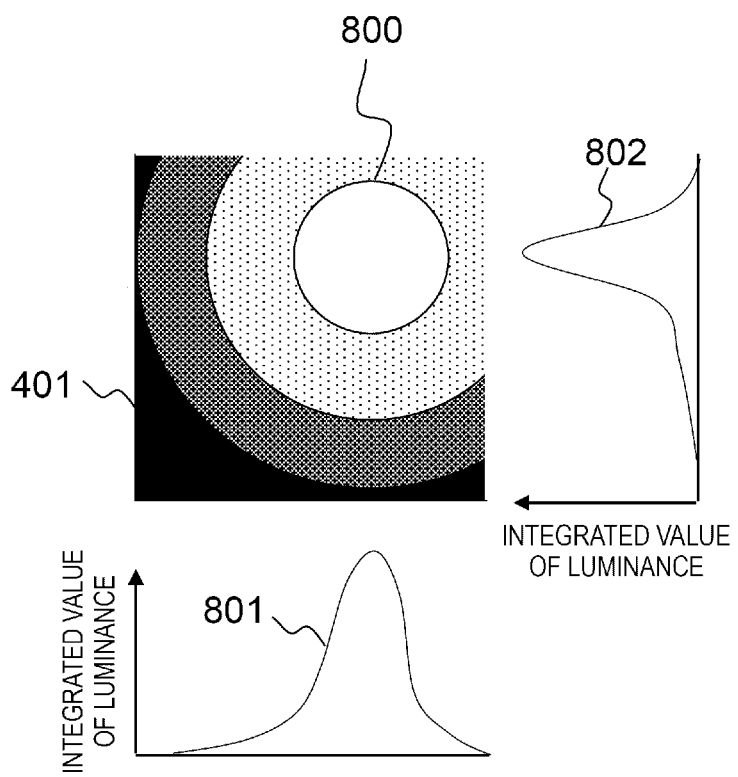

[FIG. 9A]
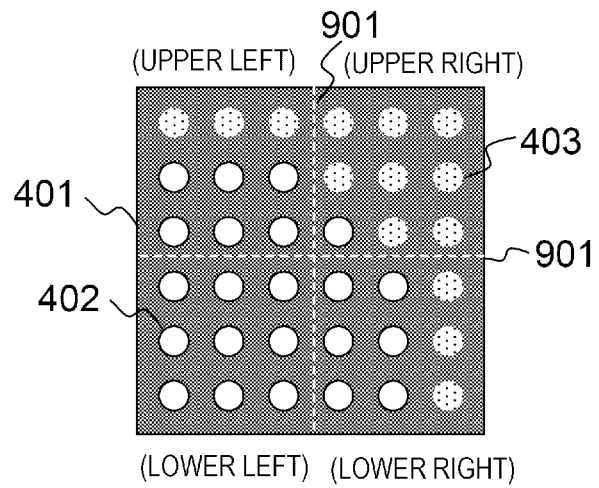
[FIG. 9B]
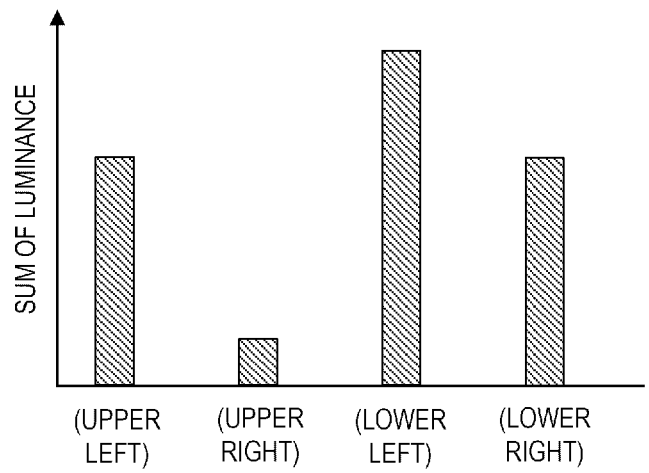

[FIG. 10C]
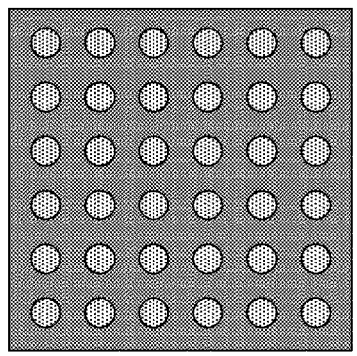
[FIG. 10B]          [FIG. 10A]          [FIG. 10D]
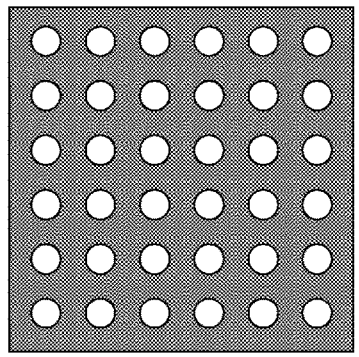 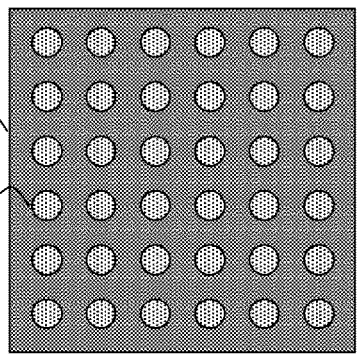 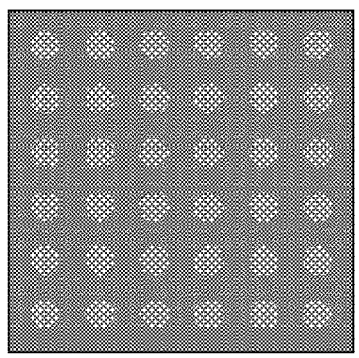
401
1001
[FIG. 10E]
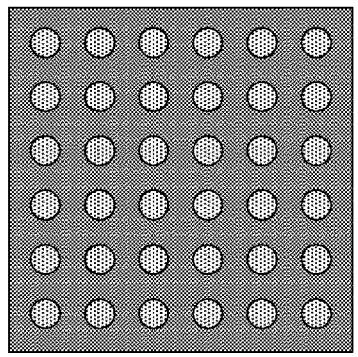

[FIG. 11]
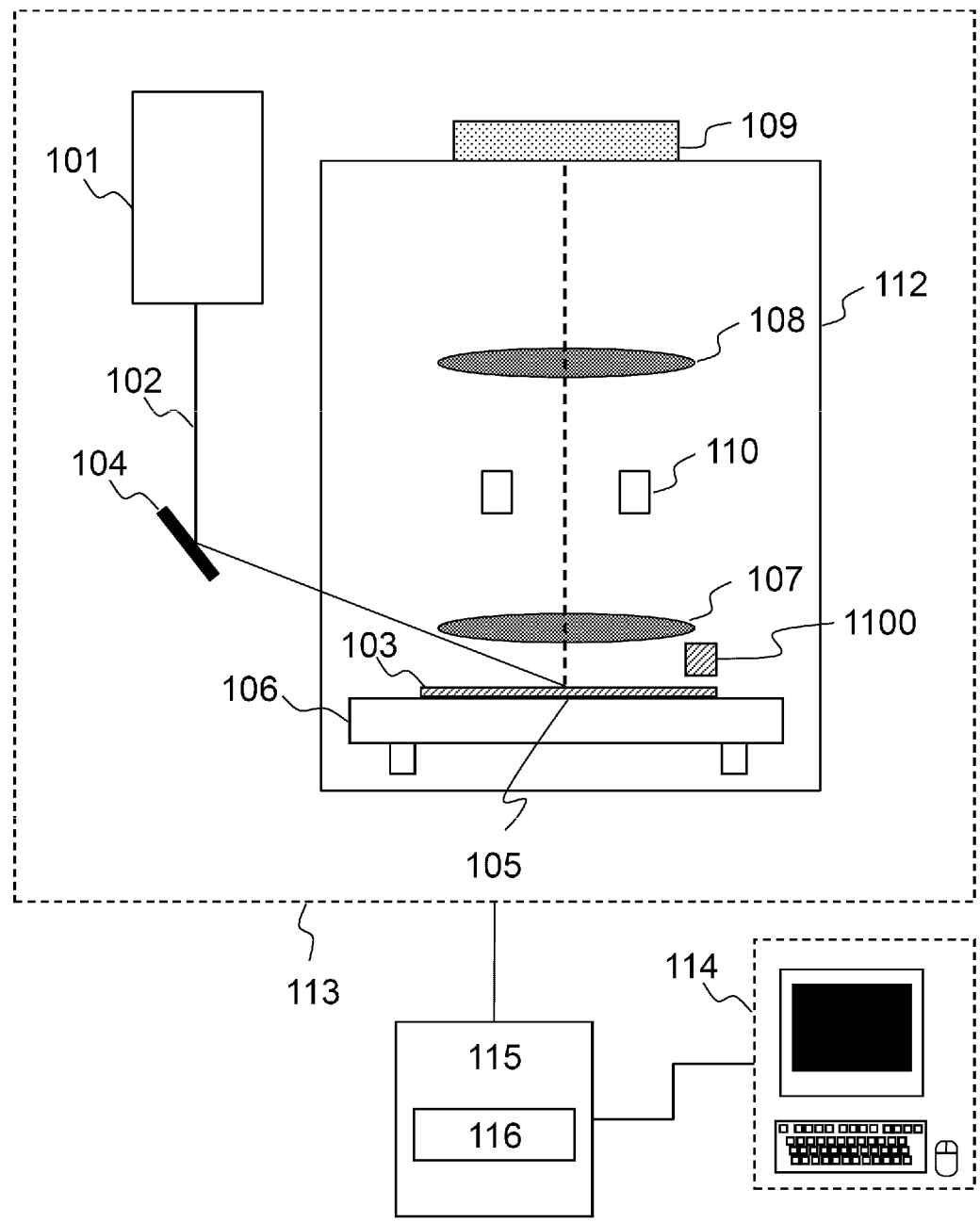

[FIG. 12]
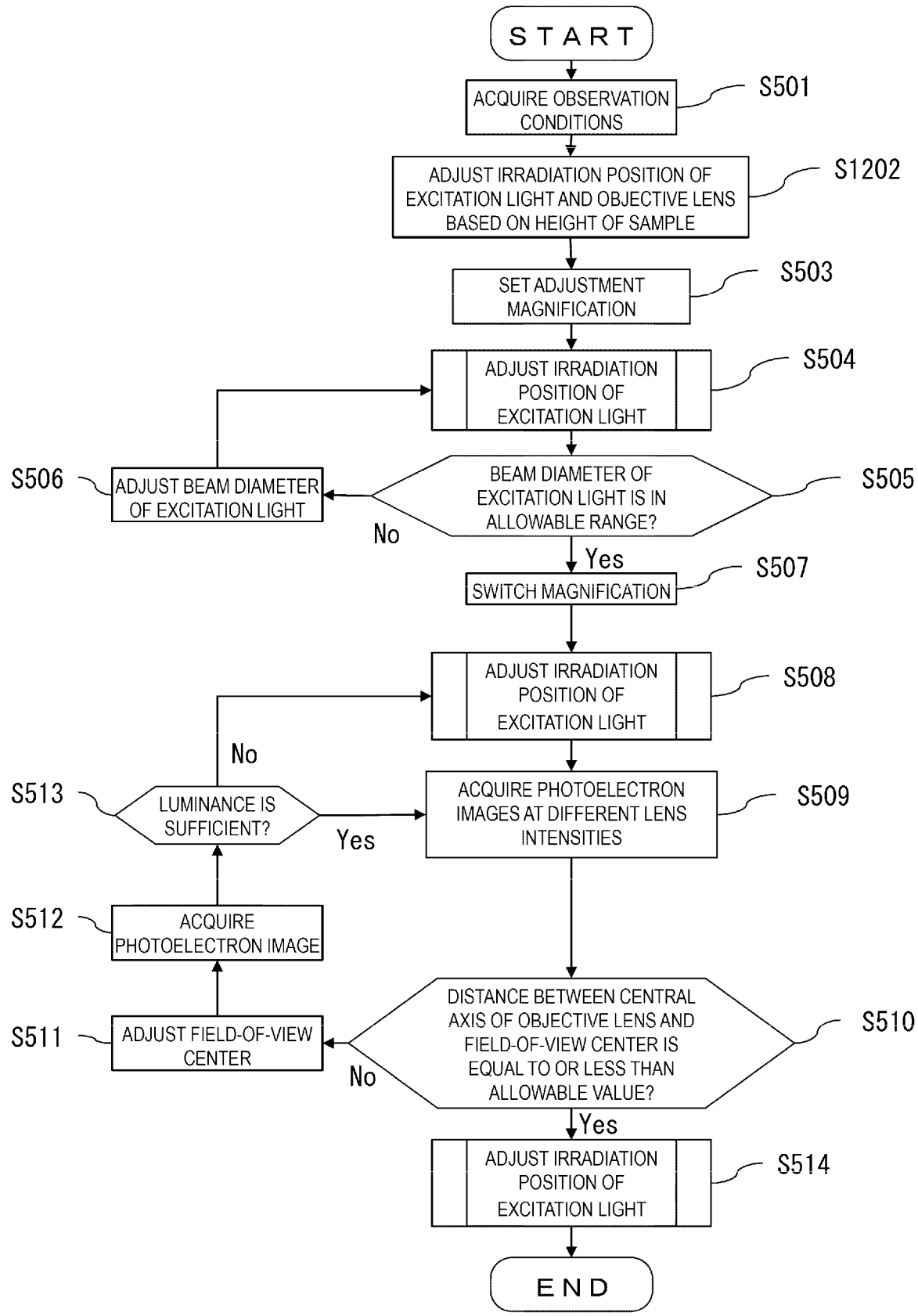

[FIG. 13]
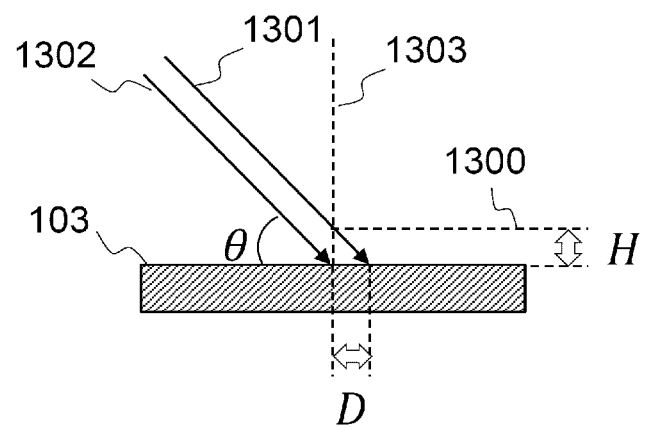

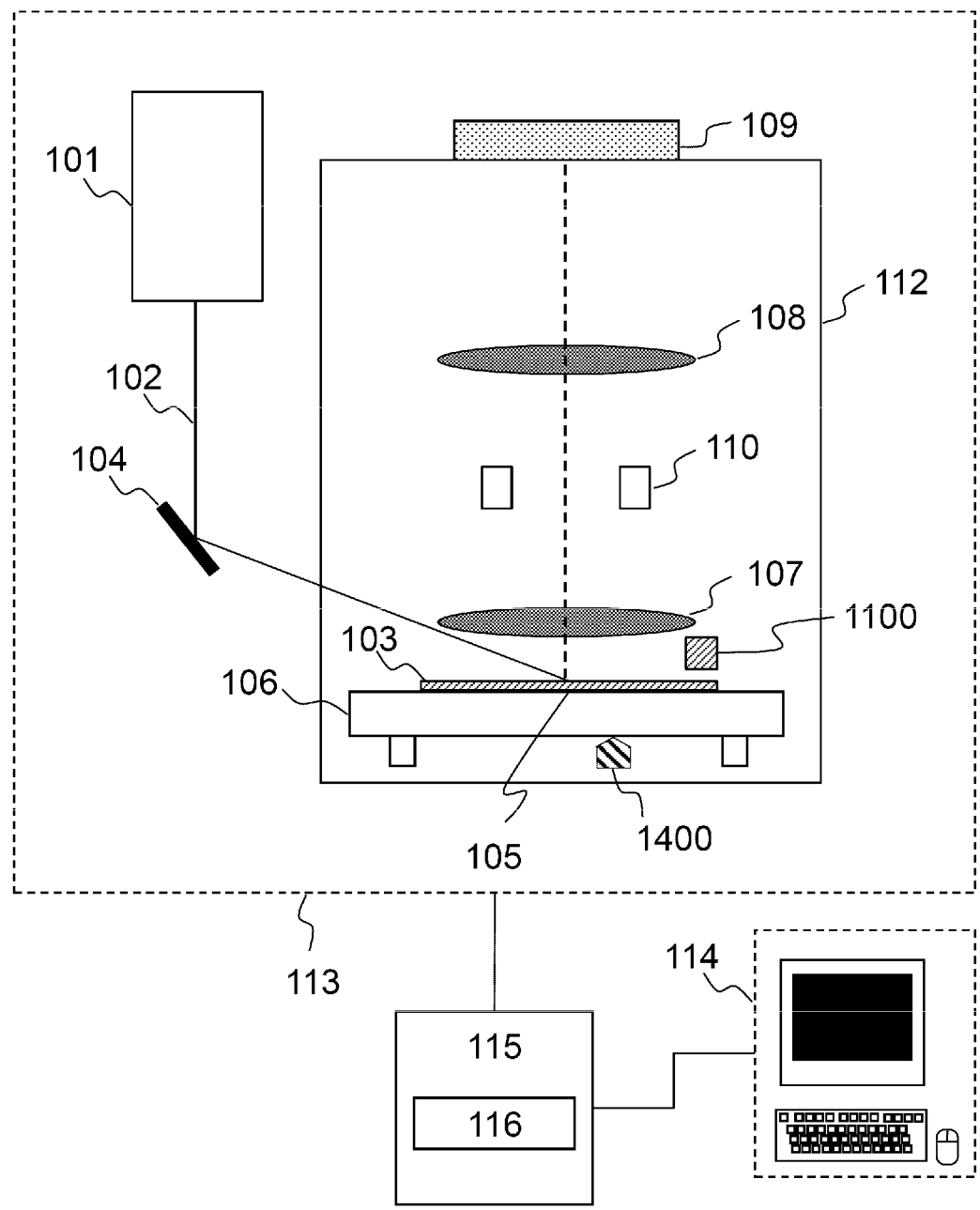
[FIG. 14]

[FIG. 15]
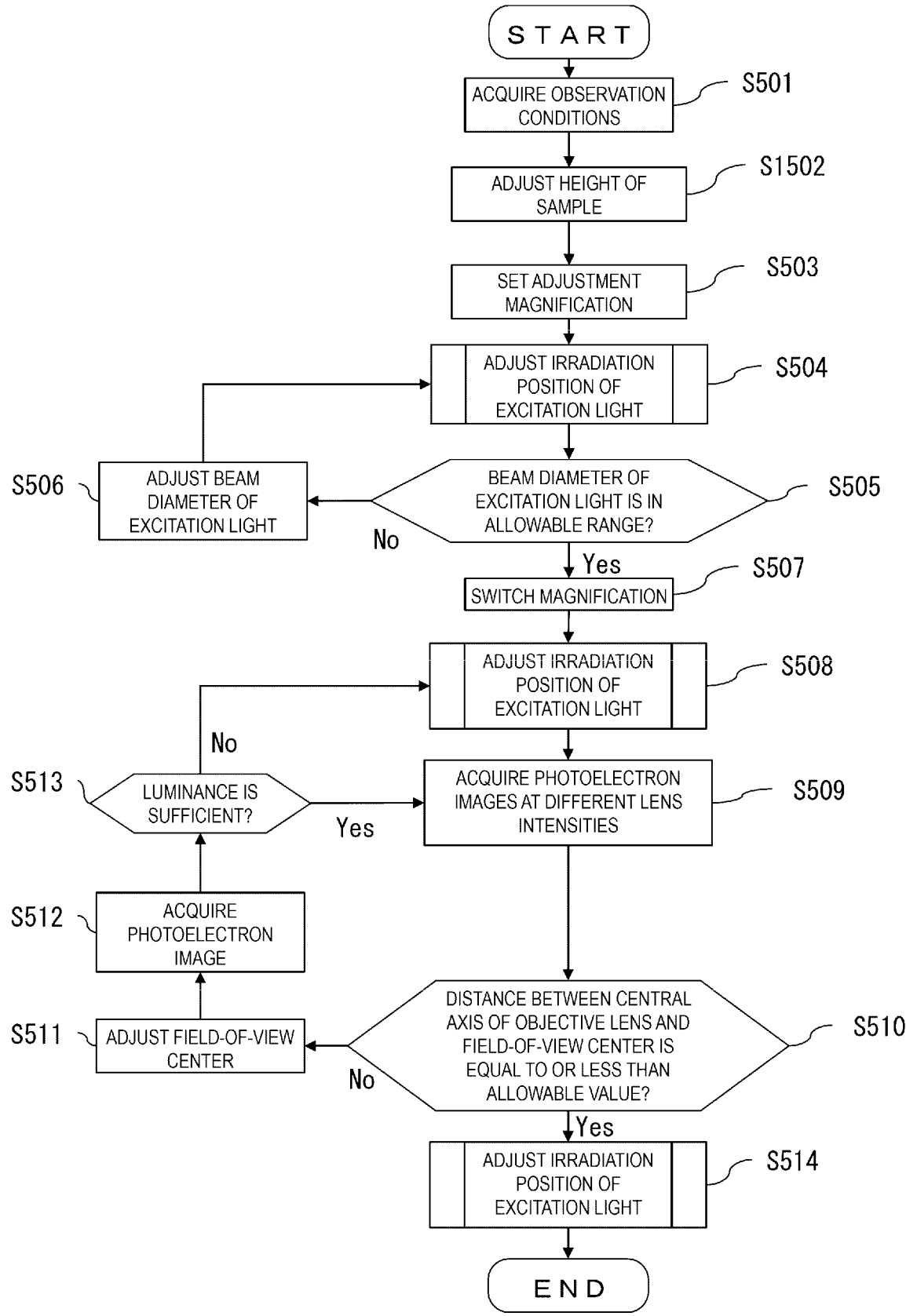

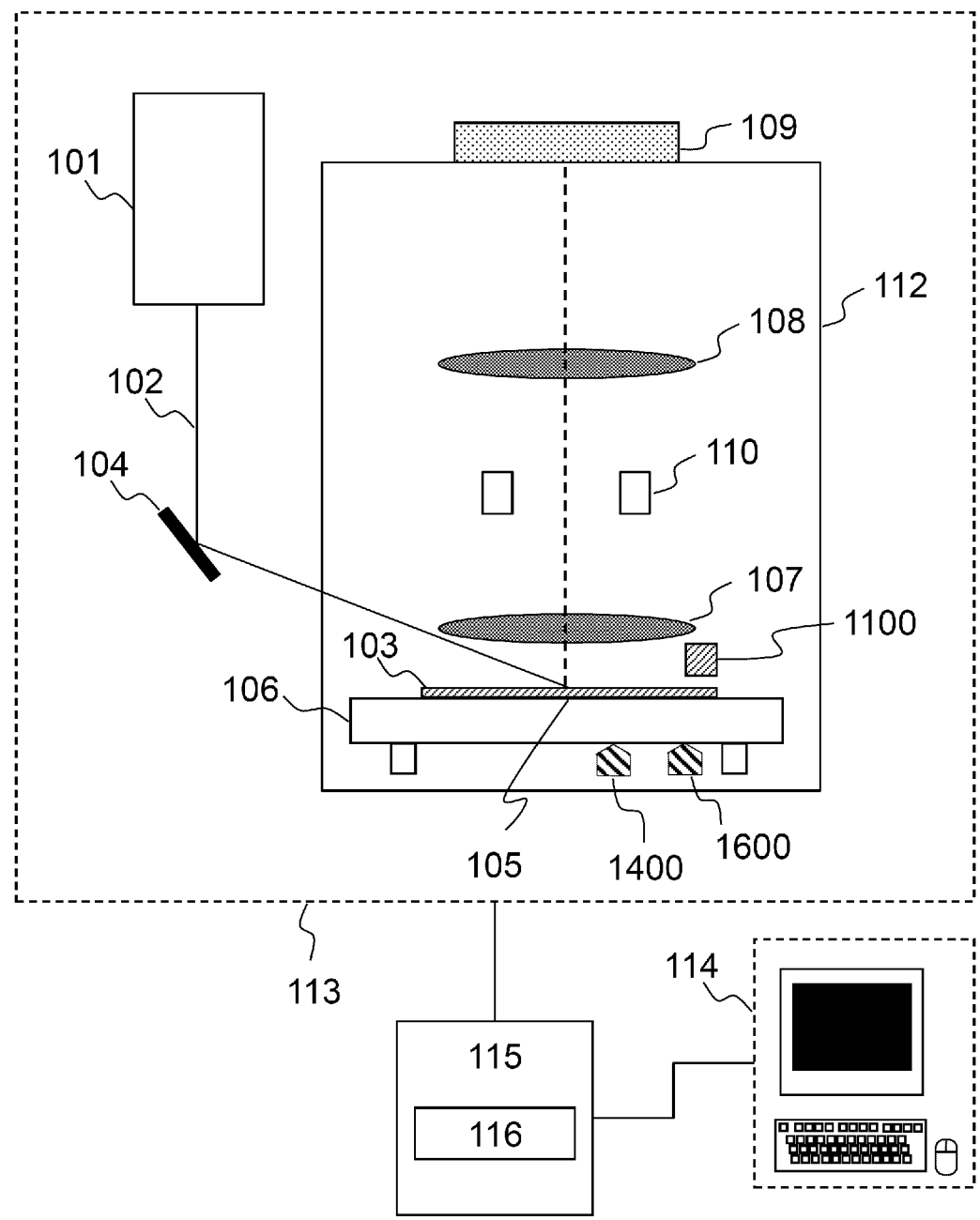
[FIG. 16]

[FIG. 17A]
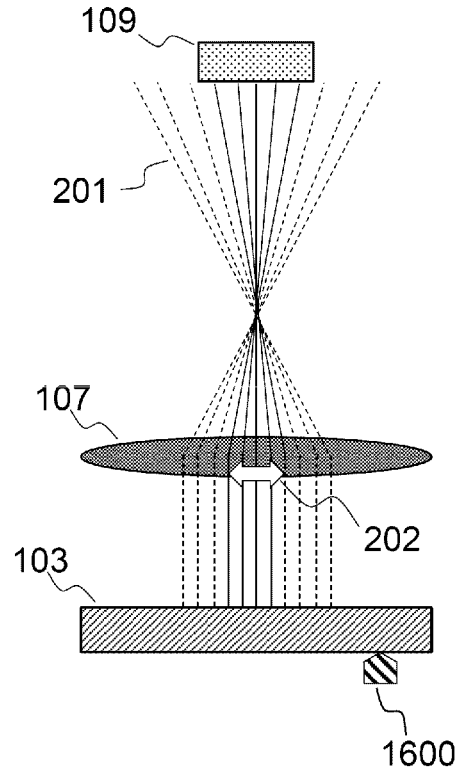
[FIG. 17B]
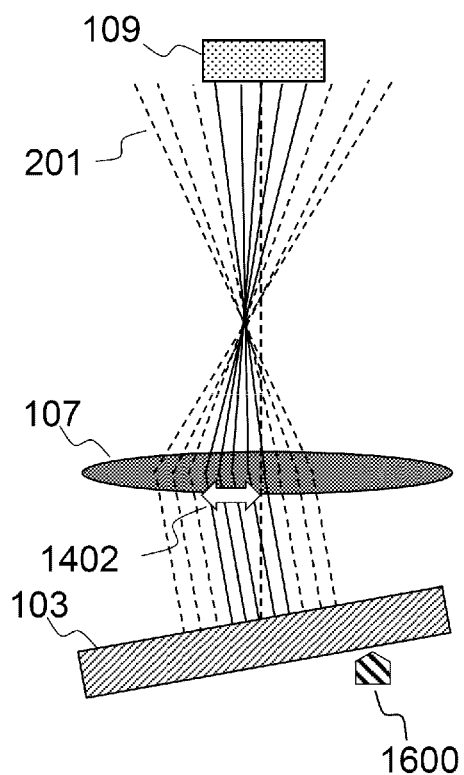

PHOTOELECTRON EMISSION MICROSCOPE

CLAIM OF PRIORITY

The present application claims priority from Japanese Patent Application JP 2022-045583 filed on Mar. 22, 2022, the content of which is hereby incorporated by reference into this application.

TECHNICAL FIELD

The present invention relates to a photoelectron emission microscope.

BACKGROUND ART

A photoelectron emission microscope (PEEM) is a device that irradiates a sample with ultraviolet light or X-rays as excitation light and detects photoelectrons emitted from the sample so as to capture a photoelectron image.

Patent Literature 1 discloses a photoelectron emission microscope including an excitation light source configured to irradiate a sample with excitation light, a camera configured to detect photoelectrons emitted from the sample and form an image, and a lens configured to focus the photoelectrons on a detection surface of the camera. In addition, it is also disclosed that the sample is irradiated with an electron beam together with the excitation light, and an image is formed by selecting and detecting photoelectrons based on an angular distribution of the photoelectrons emitted from the sample and reflected electrons while the reflected electrons are removed.

CITATION LIST

Patent Literature

PTL 1: JP4413618B

SUMMARY OF INVENTION

Technical Problem

However, in Patent Literature 1, no consideration is given to a preparation time for capturing a photoelectron image having high luminance and resolution. When a positional misalignment between an irradiation position of excitation light and a field-of-view center of a camera is large, luminance of a photoelectron image decreases, and when a positional misalignment between a central axis of an objective lens and the field-of-view center is large, resolution of the photoelectron image decreases. In addition, the central axis of the objective lens changes depending on a height and an inclination of a sample. That is, in order to capture a photoelectron image with high luminance and resolution, it is necessary to align the irradiation position of the excitation light and the field-of-view center with the central axis of the objective lens that changes depending on the sample before capturing, and it takes time to perform the alignment.

Therefore, an object of the invention is to provide a photoelectron emission microscope capable of shortening a preparation time for capturing a photoelectron image having high luminance and resolution.

Solution to Problem

In order to achieve the object described above, the invention provides a photoelectron emission microscope including: a sample stage on which a sample is to be placed; an excitation light source configured to irradiate the sample with excitation light; a camera configured to detect photoelectrons emitted from the sample and capture a photoelectron image; an objective lens configured to focus the photoelectrons on a detection surface of the camera; and a control unit configured to control each unit, in which the control unit aligns, based on a luminance distribution of a first photoelectron image, a field-of-view center of the camera with an irradiation position of the excitation light, and aligns, based on a second photoelectron image and a third photoelectron image that are captured by changing a lens intensity of the objective lens, the field-of-view center with a central axis of the objective lens.

Advantageous Effects of Invention

According to the invention, it is possible to provide the photoelectron emission microscope capable of shortening a preparation time for capturing a photoelectron image having high luminance and resolution.

BRIEF DESCRIPTION OF DRAWINGS

FIG. 1 is an overall configuration diagram of a photoelectron emission microscope according to a first embodiment.

FIG. 2A shows control of a field of view.

FIG. 2B shows control of a field of view.

FIG. 3A shows a change in a trajectory of photoelectrons along with a change in a lens intensity of an objective lens.

FIG. 3B shows a change in a photoelectron image along with the change in the lens intensity of the objective lens.

FIG. 4A shows an alignment of an irradiation position of excitation light, a field-of-view center of a camera, and a central axis of the objective lens.

FIG. 4B shows the alignment of the irradiation position of the excitation light, the field-of-view center of the camera, and the central axis of the objective lens.

FIG. 4C shows the alignment of the irradiation position of the excitation light, the field-of-view center of the camera, and the central axis of the objective lens.

FIG. 4D shows the alignment of the irradiation position of the excitation light, the field-of-view center of the camera, and the central axis of the objective lens.

FIG. 4E shows the alignment of the irradiation position of the excitation light, the field-of-view center of the camera, and the central axis of the objective lens.

FIG. 4F shows the alignment of the irradiation position of the excitation light, the field-of-view center of the camera, and the central axis of the objective lens.

FIG. 4G shows the alignment of the irradiation position of the excitation light, the field-of-view center of the camera, and the central axis of the objective lens.

FIG. 4H shows the alignment of the irradiation position of the excitation light, the field-of-view center of the camera, and the central axis of the objective lens.

FIG. 5 shows an example of a process flow in the first embodiment.

FIG. 6 shows an example of an adjustment screen in the first embodiment.

FIG. 7 shows an example of a process flow for adjusting the irradiation position of the excitation light.

FIG. 8 shows an example of a process for calculating the irradiation position of the excitation light.

FIG. 9A shows an example of a process for obtaining a direction in which the irradiation position of the excitation light is present.

FIG. 9B shows an example of the process for obtaining the direction in which the irradiation position of the excitation light is present.

FIG. 10A shows another example of the process for adjusting the irradiation position of the excitation light.

FIG. 10B shows another example of the process for adjusting the irradiation position of the excitation light.

FIG. 10C shows another example of the process for adjusting the irradiation position of the excitation light.

FIG. 10D shows another example of the process for adjusting the irradiation position of the excitation light.

FIG. 10E shows another example of the process for adjusting the irradiation position of the excitation light.

FIG. 11 is an overall configuration diagram of a photoelectron emission microscope according to a second embodiment.

FIG. 12 shows an example of a process flow in the second embodiment.

FIG. 13 shows a change in an irradiation position of excitation light along with a change in a height of a sample.

FIG. 14 is an overall configuration diagram of a photoelectron emission microscope according to a third embodiment.

FIG. 15 shows an example of a process flow in the third embodiment.

FIG. 16 is an overall configuration diagram of a photoelectron emission microscope according to a fourth embodiment.

FIG. 17A shows a change in a field of view due to inclination adjustment of a sample.

FIG. 17B shows the change in the field of view due to the inclination adjustment of the sample.

DESCRIPTION OF EMBODIMENTS

Hereinafter, embodiments of a photoelectron emission microscope according to the invention will be described with reference to the accompanying drawings. In the following description and the accompanying drawings, elements having the same function and configuration are denoted by the same reference signs, and the repeated description thereof is omitted.

First Embodiment

An overall configuration of a photoelectron emission microscope according to a first embodiment will be described with reference to FIG. 1. The photoelectron emission microscope is a device that irradiates a sample with excitation light and detects photoelectrons emitted from the sample so as to capture a photoelectron image. The photoelectron emission microscope includes a device body 113, a control unit 115, and an input and output unit 114.

The control unit 115 is a device that controls each unit provided in the device body 113, and is implemented by, for example, a computer. In addition, the control unit 115 includes a storage unit 116, and the storage unit 116 stores parameters related to control of the device body 113 and a captured photoelectron image. The input and output unit 114 is a device to which conditions related to imaging of the photoelectron image are input and on which the captured photoelectron image is displayed. The input and output unit 114 includes, for example, a keyboard, a mouse, a touch panel, and a monitor. The device body 113 includes an excitation light source 101, a sample stage 106, an objective lens 107, a magnifying lens 108, a camera 109, and a deflector 110. The sample stage 106, the objective lens 107, the magnifying lens 108, and the deflector 110 are disposed in a vacuum chamber 112 subjected to vacuum evacuation.

The excitation light source 101 irradiates a sample 103 placed on the sample stage 106 with excitation light. The excitation light is, for example, ultraviolet light, X-rays, or synchrotron radiation, and the sample 103 is irradiated with the excitation light via an optical path 102 and an irradiation position adjustment unit 104. The excitation light has a spatial spread according to a predetermined intensity distribution, for example, a Gaussian distribution, a center of the intensity distribution is referred to as an irradiation position 105 of the excitation light, and a half-width of the intensity distribution is referred to as a beam diameter.

The optical path 102 guides the excitation light to the sample 103, and includes, for example, a mirror or a lens arranged on an optical surface plate, or an optical fiber.

The irradiation position adjustment unit 104 adjusts a position irradiated with the excitation light on a surface of the sample 103, and is a mechanism that inclines or moves a mirror that reflects the excitation light. The irradiation position adjustment unit 104 may also be a lens that refracts the excitation light or a mechanism that inclines or moves the excitation light source 101.

In the camera 109, detection elements that detect photoelectrons emitted from the sample 103 due to the irradiation with the excitation light are two-dimensionally arranged. Each detection element corresponds one-to-one to each point on the surface of the sample 103. The photoelectrons emitted from each point on the surface of the sample 103 are magnified by the magnifying lens 108 and then detected by each detection element, and the photoelectron image is acquired based on an intensity of the detected photoelectrons.

The objective lens 107 focuses the photoelectrons emitted from the sample 103 on a detection surface of the camera 109, and includes an electric field formed rotationally symmetrically by applying a negative voltage to the sample 103 via an electrode provided above the sample 103, and a magnetic field formed rotationally symmetrically by applying a current to a coil provided inside the objective lens. A central axis of the electric field is referred to as a central axis of the objective lens 107. In addition, since the electric field changes depending on a height and an inclination of the sample 103, a position of the central axis of the objective lens 107 also changes depending on the sample 103. In the objective lens 107, as a distance from the central axis increases, aberration increases, and resolution of the photoelectron image decreases.

The deflector 110 controls a field of view of the camera 109 by deflecting a trajectory of the photoelectrons emitted from the sample 103. The control of the field of view of the camera 109 will be described with reference to FIGS. 2A and 2B. FIG. 2A shows a state in which a trajectory of photoelectrons 201 is not deflected, and FIG. 2B shows a state in which the trajectory is deflected. In addition, in order to simplify the description, only photoelectrons emitted in a vertical direction among photoelectrons radially emitted from each point on the surface of the sample 103 by irradiation with the excitation light are shown in FIGS. 2A and 2B.

Since the photoelectron image is acquired based on an intensity of the photoelectrons 201 detected by the camera 109, a range into which the photoelectrons 201 incident on the camera 109 are emitted is the field of view of the camera 109. In FIGS. 2A and 2B, a trajectory of the photoelectrons 201 incident on the camera 109 is indicated by a solid line, and a trajectory of the photoelectrons 201 not incident on the camera 109 is indicated by a dotted line. In addition, a field of view 202 in FIG. 2A and a field of view 203 in FIG. 2B are indicated by double-headed arrows. The field of view 202 when the trajectory of the photoelectrons 201 is not deflected is located at a center of the sample 103, whereas the field of view 203 when the trajectory is deflected is moved to a left side of the sample 103. That is, the field of view of the camera 109 can be controlled by deflecting the trajectory of the photoelectrons by the deflector 110. When a positional misalignment between the field of view of the camera 109 and the irradiation position of the excitation light is large, luminance of the photoelectron image decreases.

A change in the trajectory of the photoelectrons and a change in the photoelectron image along with a change in a lens intensity of the objective lens 107 will be described with reference to FIGS. 3A and 3B. FIG. 3A shows a trajectory 301 and a trajectory 303 passing through the central axis of the objective lens 107, and a trajectory 302 and a trajectory 304 passing through a position away from the central axis of the objective lens 107. The trajectory 301 and the trajectory 302 indicated by solid lines are obtained when the lens intensity of the objective lens 107 is adjusted to form an image on a detection surface 300 of the camera, and the trajectory 303 and the trajectory 304 that are indicated by dotted lines are obtained when the lens intensity of the objective lens 107 is changed. Further, FIG. 3A shows a photoelectron image 311, a photoelectron image 312, a photoelectron image 313, and a photoelectron image 314 when a circular pattern on the surface of the sample 103 is observed along the trajectory 301, the trajectory 302, the trajectory 303, and the trajectory 304, respectively.

The trajectory 301 passing through the central axis of the objective lens 107 becomes the trajectory 303 due to the change in the lens intensity, and, although a focus thereof is shifted, there is no change in an arrival position thereof. Meanwhile, the trajectory 302 passing through the position away from the central axis becomes the trajectory 304 due to the change in the lens intensity, a focus thereof is shifted and an arrival position thereof is moved. In addition, the photoelectron image 311 corresponding to the trajectory 301 becomes the photoelectron image 313 due to the change in the lens intensity, and, although a pattern thereof is blurred, a position thereof does not change. Meanwhile, the photoelectron image 312 corresponding to the trajectory 302 becomes the photoelectron image 314 due to the change in the lens intensity, a pattern thereof is blurred and a position thereof is moved.

FIG. 3B shows photoelectron images when a sample in which circular patterns are two-dimensionally arranged is imaged at different lens intensities. The circular patterns at the time of a focused lens intensity are indicated by solid lines, and the circular patterns at the time of defocusing are indicated by dotted lines. Blurring occurring at the time of defocusing is omitted. Since positions of the circular patterns imaged with the different lens intensities coincide with each other at a position 320, the central axis of the objective lens 107 corresponds to the position 320. That is, the central axis of the objective lens 107 is visualized by comparing the photoelectron images captured by changing the lens intensity of the objective lens 107.

When the positional misalignment between the irradiation position of the excitation light and the field-of-view center of the camera is large, luminance of the photoelectron image decreases, and when the positional misalignment between the central axis of the objective lens and the field-of-view center is large, resolution of the photoelectron image decreases. In addition, the central axis of the objective lens changes depending on the height and the inclination of the sample. Therefore, in order to capture the photoelectron image with high luminance and resolution, it is necessary to align the irradiation position of the excitation light and the field-of-view center with the central axis of the objective lens that changes depending on the sample.

The alignment of the irradiation position of the excitation light, the field-of-view center of the camera, and the central axis of the objective lens will be described with reference to FIGS. 4A to 4H. In FIGS. 4A to 4H, a bright pattern 402, a dark pattern 403, an excitation light irradiation position 404, and an objective lens central axis 405 are shown in a field of view 401 as a schematic representation of the photoelectron image of the circular patterns arranged two-dimensionally. The bright pattern 402 is a circular pattern with high luminance, and the dark pattern 403 is a circular pattern with low luminance. In addition, a square mark indicating the excitation light irradiation position 404 and a triangular mark indicating the objective lens central axis 405 are not shown in the actual photoelectron image. Since the excitation light has a spatial spread according to a predetermined intensity distribution, a pattern close to the excitation light irradiation position 404 is the bright pattern 402, and a pattern far from the excitation light irradiation position 404 is the dark pattern 403.

FIGS. 4A, 4C, 4E, and 4G are photoelectron images when the lens intensity of the objective lens is focused, and FIGS. 4B, 4D, 4F, and 4H are photoelectron images when the lens intensity is defocused, respectively. In addition, FIGS. 4A and 4B show a state in which the excitation light irradiation position 404 and the objective lens central axis 405 are misaligned with a center of the field of view 401. FIGS. 4C and 4D show a state in which the excitation light irradiation position 404 coincides with the center of the field of view 401 whereas the objective lens central axis 405 is misaligned with the center of the field of view 401. FIGS. 4E and 4F show a state in which the excitation light irradiation position 404 is misaligned with the center of the field of view 401 whereas the objective lens central axis 405 coincides with the center of the field of view 401. FIGS. 4G and 4H show a state in which the excitation light irradiation position 404 and the objective lens central axis 405 coincide with the center of the field of view 401.

Hereinafter, a change in the photoelectron image in a process for aligning the excitation light irradiation position 404 and the objective lens central axis 405 with the center of the field of view 401 will be described with the state in FIGS. 4A and 4B serving as a starting point. In FIGS. 4A and 4B, since the excitation light irradiation position 404 is misaligned leftward and downward with respect to the center of the field of view 401, the dark pattern 403 is shown on an upper right side. When the irradiation position adjustment unit 104 is controlled to move the excitation light irradiation position 404 to the center of the field of view 401 in order to correct the misalignment, only the bright pattern 402 is located in the field of view 401 as shown in FIGS. 4C and 4D. However, the objective lens central axis 405 is located at the upper right of the field of view 401. When the deflector 110 is controlled to move the center of the field of view 401 to the objective lens central axis 405 in order to correct the misalignment, the objective lens central axis 405 coincides with the center of the field of view 401 as shown in FIGS. 4E and 4F. However, the excitation light irradiation position 404 moves leftward and downward along with the movement of the field of view 401. Therefore, when the irradiation position adjustment unit 104 is controlled again to move the excitation light irradiation position 404 to the center of the field of view 401, the excitation light irradiation position 404 and the objective lens central axis 405 coincide with the center of the field of view 401 as shown in FIGS. 4G and 4H.

An example of a process flow in the first embodiment will be described step by step with reference to FIG. 5.
(S501)

The control unit 115 acquires observation conditions. The acquired observation conditions are set for the device body 113. The observation conditions are input via an adjustment screen displayed on the input and output unit 114. An example of the adjustment screen will be described with reference to FIG. 6. The adjustment screen shown in FIG. 6 includes a condition selection unit 601, an adjustment start button 607, a photoelectron image display unit 608, a fine adjustment unit 609, a parameter adjustment unit 610, and a condition storage button 614.

The condition selection unit 601 includes an excitation light condition selection unit 602, an electron optical system condition selection unit 603, a camera condition selection unit 604, an allowable error setting unit 605, and a preset button 606. In the excitation light condition selection unit 602, a wavelength, an intensity, a beam diameter, and a polarization direction of the excitation light are selected as parameters related to the excitation light source 101 and the optical path 102. The polarization direction includes a polarization direction other than linear polarization, such as circular polarization. In the electron optical system condition selection unit 603, a magnification and an aperture are selected as parameters related to the objective lens 107 and the magnifying lens 108. In the camera condition selection unit 604, an exposure time and an imaging mode are selected as parameters related to the camera 109. In the allowable error setting unit 605, an allowable error when the field-of-view center, the irradiation position of the excitation light, and the central axis of the objective lens are aligned is set. The preset button 606 is a button that is pressed when conditions stored in advance in the storage unit 116 are to be read.

The adjustment start button 607 is a button that is pressed when condition selection in the condition selection unit 601 is completed and the alignment of the field-of-view center, the irradiation position of the excitation light, and the central axis of the objective lens is started.

The photoelectron image display unit 608 displays a photoelectron image acquired when the field-of-view center, the irradiation position of the excitation light, and the central axis of the objective lens are aligned.

In the fine adjustment unit 609, after the field-of-view center, the irradiation position of the excitation light, and the central axis of the objective lens are aligned, a focus and a magnification of the objective lens 107, and an excitation light intensity are finely adjusted. In the fine adjustment unit 609, the polarization direction of the excitation light and the parameters related to the camera 109 may also be finely adjusted.

The parameter adjustment unit 610 includes a field-of-view adjustment unit 611, an excitation light irradiation position adjustment unit 612, and a wobbling button 613. The field-of-view adjustment unit 611 adjusts the field of view. That is, the deflector 110 is controlled according to an operation on the field-of-view adjustment unit 611. In the excitation light irradiation position adjustment unit 612, the irradiation position of the excitation light is adjusted. That is, the irradiation position adjustment unit 104 is controlled according to an operation on the excitation light irradiation position adjustment unit 612. The wobbling button 613 is a button that is pressed when checking the position of the central axis of the objective lens. That is, when the wobbling button 613 is pressed, photoelectron images acquired while continuously changing the lens intensity of the objective lens are displayed on the photoelectron image display unit 608.

The condition storage button 614 is a button that is pressed when the conditions adjusted by the fine adjustment unit 609 or the parameter adjustment unit 610 are to be stored. The adjusted conditions are stored in the storage unit 116.

The description returns to FIG. 5.
(S502)

The control unit 115 adjusts the lens intensity of the objective lens so as to focus on the sample.
(S503)

The control unit 115 sets a lens intensity of the magnifying lens 108 to an adjustment magnification. The adjustment magnification may be set according to the beam diameter of the excitation light selected as the observation condition, or may be set to a minimum magnification. When the adjustment magnification is set according to the beam diameter, for example, the magnification is set such that the field of view is three times the beam diameter.
(S504)

The control unit 115 performs adjustment so as to align the irradiation position of the excitation light with the field-of-view center. An example of a process flow for adjusting the irradiation position of the excitation light executed in S504 will be described with reference to FIG. 7.
(S701)

The control unit 115 acquires a photoelectron image. The acquired photoelectron image corresponds to, for example, a sample in which circular patterns are two-dimensionally arranged.
(S702)

The control unit 115 calculates the irradiation position of the excitation light based on a luminance distribution of the photoelectron image acquired in S701.

An example of a process for calculating the irradiation position of the excitation light performed in S702 will be described with reference to FIG. 8. FIG. 8 shows a luminance distribution 800 in the field of view 401 of the photoelectron image, in which a region with high luminance is represented by white and a region with low luminance is represented by black. Although the actual photoelectron image includes circular patterns, the circular patterns are omitted in FIG. 8 to simplify the description.

The control unit 115 creates a one-dimensional profile of luminance by integrating the luminance distribution 800 in one direction, and calculates a position at which the one-dimensional profile is maximum as the irradiation position of the excitation light. For example, the luminance distribution 800 is integrated in a vertical direction and a horizontal direction to create a horizontal direction profile 801 and a vertical direction profile 802. Then, a position where each of the horizontal direction profile 801 and the vertical direction profile 802 is maximum is calculated as the irradiation position of the excitation light. The direction in which the integration is performed is not limited to the vertical direction or the horizontal direction, and may be an oblique direction. However, it is desirable that the two directions are orthogonal to each other.

Alternatively, the irradiation position of the excitation light may be calculated by fitting the luminance distribution 800 to a two-dimensional normal distribution function or the like without using the one-dimensional profile. Further, the beam diameter of the excitation light may be calculated based on the one-dimensional profile or the two-dimensional normal distribution function. For example, a half-width of the one-dimensional profile is calculated as the beam diameter.

When the irradiation position of the excitation light is not in the field of view 401, the irradiation position of the excitation light is not obtained in the one-dimensional profile created based on the luminance distribution 800. Therefore, instead of calculating the irradiation position of the excitation light, a direction may be obtained in which the irradiation position of the excitation light is present.

With reference to FIGS. 9A and 9B, an example of a process for obtaining the direction in which the irradiation position of the excitation light is present will be described. FIG. 9A includes the bright pattern 402 and the dark pattern 403 in the field of view 401. The control unit 115 divides the field of view 401 into a plurality of regions, and compares sums of luminance of each of the divided regions so as to obtain the direction in which the irradiation position of the excitation light is present. For example, the field of view 401 is divided into four regions on upper left, upper right, lower left, and lower right sides by a dividing line 901, and sums of luminance obtained for each divided region are compared as shown in FIG. 9B. The sum of luminance shown in FIG. 9B is largest in the lower left region and smallest in the upper right region, and thus a lower left direction is obtained as the direction in which the irradiation position of the excitation light is present. The number of divisions of the field of view 401 is not limited to four, and may be nine or sixteen. In addition, a direction of the dividing line 901 is not limited to the vertical direction and the horizontal direction, and the dividing line 901 may be set radially from the field-of-view center.

The description returns to FIG. 7.

(S703)

The control unit 115 determines whether a distance between the irradiation position of the excitation light calculated in S701 and the field-of-view center is equal to or less than an allowable value. If the distance is equal to or less than the allowable value, the process flow ends, and if the distance is not equal to or less than the allowable value, the process returns to S701 via S704. When the irradiation position of the excitation light is not in the field of view, the process returns to S701 via S704. The allowable value may be read from the storage unit 116, or may be calculated based on the beam diameter selected in the excitation light condition selection unit 602 or the allowable error set in the allowable error setting unit 605 on the adjustment screen shown in FIG. 6. For example, a half of the beam diameter is calculated as the allowable value.

(S704)

The control unit 115 controls the irradiation position adjustment unit 104 based on the irradiation position of the excitation light calculated in S702, and moves the irradiation position of the excitation light to the field-of-view center. When the irradiation position of the excitation light is not in the field of view, the irradiation position of the excitation light is not calculated in S702, and only the direction is obtained in which the irradiation position of the excitation light is present. Therefore, the irradiation position adjustment unit 104 is controlled based on the obtained direction in which the irradiation position of the excitation light is present. A movement distance at this time is set to, for example, a length of one side of the field of view.

By the process for adjusting the irradiation position of the excitation light described with reference to FIG. 7, the irradiation position of the excitation light is adjusted within a predetermined distance from the field-of-view center. When the bright pattern 402 and the dark pattern 403 cannot be distinguished from each other in the field of view 401, not only the irradiation position of the excitation light but also the direction in which the irradiation position of the excitation light is present cannot be obtained. Therefore, the irradiation position of the excitation light may be adjusted based on photoelectron images acquired while the irradiation position of the excitation light is moved.

Another example of the process for adjusting the irradiation position of the excitation light will be described with reference to FIGS. 10A to 10E. FIGS. 10A to 10E show photoelectron images including a plurality of circular patterns 1001 having the same luminance as in the field of view 401. The circular pattern 1001 having high luminance is represented by white, and the circular pattern 1001 having low luminance is represented by black. In addition, FIG. 10A is a photoelectron image at the start of adjustment, and FIGS. 10B to 10E are photoelectron images when the irradiation position of the excitation light in FIG. 10A is moved in each of left, upper, right, and lower directions. A movement distance at this time may be a predetermined value or may be set according to the beam diameter. For example, ⅓ of the beam diameter is set as the movement distance.

The control unit 115 obtains the direction in which the irradiation position of the excitation light is present by comparing sums of luminance of photoelectron images acquired while moving the irradiation position of the excitation light. For example, when the sums of luminance of the photoelectron images in FIGS. 10A to 10E are compared, since FIG. 10B is maximum and FIG. 10D is minimum, the left direction is obtained as the direction in which the irradiation position of the excitation light is present. The control unit 115 controls the irradiation position adjustment unit 104 based on the obtained presence direction so as to move the irradiation position of the excitation light. In this way, by repeating the comparison of the sums of luminance of the photoelectron images acquired while moving the irradiation position of the excitation light and movement of the irradiation position of the excitation light based on a comparison result, the irradiation position of the excitation light is adjusted within a predetermined distance from the field-of-view center.

The description returns to FIG. 5.

(S505)

The control unit 115 determines whether the beam diameter of the excitation light is within an allowable range. When the beam diameter is within the allowable range, the process proceeds to S507, and when the beam diameter is not within the allowable range, the process returns to S504 via S506. The beam diameter of the excitation light is calculated based on, for example, the horizontal direction profile 801 or the vertical direction profile 802 shown in FIG. 8. The allowable range may be read from the storage unit 116, or may be calculated based on the beam diameter selected in the excitation light condition selection unit 602 and the allowable error set in the allowable error setting unit 605 on the adjustment screen shown in FIG. 6.

(S506)

The control unit 115 controls the excitation light source 101 and the optical path 102 to adjust the beam diameter of the excitation light.

(S507)

The control unit 115 controls the lens intensity of the magnifying lens 108 to switch the magnification. The magnification may be switched to the magnification selected in the electron optical system condition selection unit 603 on the adjustment screen shown in FIG. 6, for example, or may be switched to a maximum magnification.

(S508)

The control unit 115 performs adjustment so as to align the irradiation position of the excitation light with the field-of-view center. The process for adjusting the irradiation position of the excitation light executed in S508 is the process flow shown in FIG. 7, similarly to S504. However, the allowable value in S703 is set to be smaller.

(S509)

The control unit 115 controls the lens intensity of the objective lens 107 to acquire photoelectron images at different lens intensities. That is, at least two photoelectron images, that is, a photoelectron image at a focused lens intensity and a photoelectron image at a defocused lens intensity are acquired.

(S510)

The control unit 115 determines whether a distance between the central axis of the objective lens 107 and the field-of-view center is equal to or less than an allowable value. If the distance is equal to or less than the allowable value, the process proceeds to S514, and if the distance is not equal to or less than the allowable value, the process proceeds to S511. The central axis of the objective lens 107 is visualized by comparing the at least two photoelectron images acquired in S509. The allowable value may be read from the storage unit 116, or may be calculated based on the magnification selected in the electron optical system condition selection unit 603 or the allowable error set in the allowable error setting unit 605 on the adjustment screen shown in FIG. 6.

(S511)

The control unit 115 controls the deflector 110 to adjust the field-of-view center so as to be aligned with the central axis of the objective lens 107. When the central axis of the objective lens 107 is not in the field of view, a direction in which the central axis of the objective lens 107 is present is obtained by comparing the at least two photoelectron images acquired in S509. The control unit 115 controls the deflector 110 based on the obtained presence direction so as to move the field-of-view center. A movement distance at this time is set to, for example, a length of one side of the field of view.

(S512)

The control unit 115 acquires a photoelectron image.

(S513)

The control unit 115 determines whether luminance of the photoelectron image acquired in S512 is sufficient. If the luminance is sufficient, the process returns to S509, and a photoelectron image at a different lens intensity is acquired again. If the luminance is not sufficient, the process returns to S508, and the process for adjusting the irradiation position of the excitation light is executed. A predetermined reference value is used to determine whether the luminance is sufficient. The reference value is read from the storage unit 116 and compared with a sum of luminance of the photoelectron images acquired in S512.

(S514)

The control unit 115 performs adjustment so as to align the irradiation position of the excitation light with the field-of-view center. The process for adjusting the irradiation position of the excitation light executed in S514 is the same as S508.

According to the process flow described with reference to FIG. 5, the field-of-view center is adjusted within a predetermined distance from the central axis of the objective lens, and the irradiation position of the excitation light is adjusted within a predetermined distance from the field-of-view center. That is, the irradiation position of the excitation light, the field-of-view center, and the central axis of the objective lens are aligned, and preparation for capturing a photoelectron image with high luminance and resolution is completed. Since the alignment of the irradiation position of the excitation light, the field-of-view center, and the central axis of the objective lens is automated based on the photoelectron image, the preparation time for imaging can be shortened. Further, in a case where a change in the irradiation direction of the excitation light guided from the excitation light source and the optical path is small and the height of the sample is constant, since the positional misalignment between the irradiation position of the excitation light and the field-of-view center is small, the processes from S503 to S506 in FIG. 5 can be omitted, and the preparation time can be further shortened.

Second Embodiment

In the first embodiment, a case is described where the alignment of the irradiation position of the excitation light, the field-of-view center, and the central axis of the objective lens is automated based on the photoelectron image. In a second embodiment, an alignment based on not only the photoelectron image but also the height of the sample will be described. Since a part of configurations and functions described in the first embodiment can be applied to the second embodiment, the same reference numerals are used for the same configurations and functions, and the description thereof will be omitted.

An overall configuration of a photoelectron emission microscope according to the second embodiment will be described with reference to FIG. 11. In the photoelectron emission microscope shown in FIG. 11, a height sensor 1100 is added to FIG. 1, and thus the description of components other than the height sensor 1100 is omitted.

The height sensor 1100 is a device that measures the height of the sample 103 placed on the sample stage 106, and includes, for example, a laser displacement meter. The height sensor 1100 measures, for example, a distance between the surface of the sample 103 and the objective lens 107, and transmits the distance to the control unit 115.

An example of a process flow in the second embodiment will be described with reference to FIG. 12. A difference from FIG. 5 is that S502 is replaced with S1202, and therefore, the description of processes other than S1202 will be simplified.

(S501)

The control unit 115 acquires the observation conditions in the same manner as in the first embodiment.

(S1202)

The control unit 115 adjusts the irradiation position of the excitation light and the lens intensity of the objective lens 107 based on the height of the sample measured by the height sensor 1100. More specifically, the irradiation position of the excitation light is adjusted according to an amount of deviation between a predetermined reference height and the height of the sample 103, and the lens intensity is adjusted according to the distance between the surface of the sample 103 and the objective lens 107. A correspondence table between the distance between the surface of the sample 103 and the objective lens 107 and the lens intensity is stored in advance in the storage unit 116.

A change in the irradiation position of the excitation light along with a change in the height of the sample 103 will be described with reference to FIG. 13. FIG. 13 shows excitation light 1301 and excitation light 1302 with which the sample 103 is irradiated. When the height of the sample 103 changes, a position deviated by a distance D from a central axis 1303 of the objective lens is irradiated with the excitation light 1301 with which the central axis 1303 of the objective lens is irradiated when the surface of the sample 103 is at the reference height 1300. Therefore, the control unit 115 moves the irradiation position of the excitation light by the distance D to change the excitation light 1301 to the excitation light 1302 with which the central axis 1303 of the objective lens is to be irradiated. The distance D is obtained by the following formula, in which the amount of deviation of the height of the sample 103 is H and an incident angle of the excitation light 1301 is θ. The incident angle θ is determined by a positional relationship between the optical path 102, the irradiation position adjustment unit 104, and the sample 103.

$$D = H/\tan\theta \quad \text{(Formula 1)}$$

That is, the control unit 115 acquires the amount of deviation H based on the height of the sample measured by the height sensor 1100, and controls the irradiation position adjustment unit 104 based on the distance D calculated using (Formula 1).

(S503) to (S514)

As in the first embodiment, the irradiation position of the excitation light, the field-of-view center, and the central axis of the objective lens are aligned.

According to the process flow described with reference to FIG. 12, the alignment of the irradiation position of the excitation light, the field-of-view center, and the central axis of the objective lens is automated based on the height of the sample together with the photoelectron image, and thus the preparation time for imaging can be shortened. By performing the alignment based not only on the photoelectron image but also on the height of the sample, the processes from S503 to S506 may be omitted, and thus the preparation time can be further shortened.

Third Embodiment

In the second embodiment, a case is described where the alignment of the irradiation position of the excitation light, the field-of-view center, and the central axis of the objective lens is automated based on the height of the sample together with the photoelectron image. In a third embodiment, a case will be described where an alignment of the irradiation position of the excitation light, the field-of-view center, and the central axis of the objective lens is performed after adjusting the height of the sample. Since a part of configurations and functions described in the first and second embodiments can be applied to the third embodiment, the same reference signs are used for the same configurations and functions, and the description thereof will be omitted.

An overall configuration of a photoelectron emission microscope according to the third embodiment will be described with reference to FIG. 14. In the photoelectron emission microscope shown in FIG. 14, a height adjustment unit 1400 is added to FIG. 11, and thus the description of components other than the height adjustment unit 1400 is omitted.

The height adjustment unit 1400 is a device that adjusts a height of the sample stage 106. The control unit 115 may control the height adjustment unit 1400 based on the height of the sample measured by the height sensor 1100.

An example of a process flow in the third embodiment will be described with reference to FIG. 15. A difference from FIG. 5 is that S502 is replaced with S1502, and therefore, the description of processes other than S1502 will be simplified.

(S501)

The control unit 115 acquires the observation conditions in the same manner as in the first embodiment.

(S1502)

The control unit 115 controls the height adjustment unit 1400 to adjust the height of the sample 103. More specifically, the amount of deviation H between the height of the sample 103 and the reference height is calculated based on a measurement value of the height sensor 1100, and the height of the sample stage 106 is adjusted such that the amount of deviation H falls within an allowable range.

(S503) to (S514)

As in the first embodiment, the irradiation position of the excitation light, the field-of-view center, and the central axis of the objective lens are aligned.

According to the process flow described with reference to FIG. 15, after the height of the sample 103 is adjusted to the reference height, the irradiation position of the excitation light, the field-of-view center, and the central axis of the objective lens are aligned. Since the alignment is automated based on the photoelectron image, the preparation time for imaging can be shortened. In addition, since the height of the sample 103 is adjusted to the reference height prior to the alignment, the number of times of the repetitive processes from S503 to S514 is reduced, and thus the preparation time can be further shortened.

Fourth Embodiment

In the first to third embodiments, cases are described where the field-of-view center is adjusted by controlling the deflector 110. The adjustment of the field-of-view center is not limited to the control of the deflector 110. In the fourth embodiment, a case will be described where the field-of-view center is adjusted by inclining the sample. Since a part of configurations and functions described in the first to third embodiments can be applied to the fourth embodiment, the same reference signs are used for the same configurations and functions, and the description thereof will be omitted.

An overall configuration of a photoelectron emission microscope according to the fourth embodiment will be described with reference to FIG. 16. In the photoelectron emission microscope shown in FIG. 16, an inclination adjustment unit 1600 is added to FIG. 14, and thus the description of components other than the inclination adjustment unit 1600 is omitted.

The inclination adjustment unit 1600 is a device that adjusts the inclination of the sample 103 by controlling inclination of the sample stage 106. The control unit 115 may control the inclination adjustment unit 1600 based on the height of the sample measured by the height sensor 1100.

A change in the field of view due to inclination adjustment of the sample will be described with reference to FIGS. 17A and 17B. FIG. 17A shows the trajectory of the photoelectrons 201 when the surface of the sample 103 is horizontal.

A trajectory incident on the camera 109 is indicated by a solid line, a trajectory not incident thereon is indicated by a dotted line, and the field of view 202 is indicated by a double-headed arrow.

FIG. 17B shows the trajectory of the photoelectrons 201 when the surface of the sample 103 is inclined by the inclination adjustment unit 1600. Due to the inclination of the surface of the sample 103, the trajectory of the photoelectrons 201 changes, and the field of view 202 is located at the center of the sample 103 in FIG. 17A, whereas a field of view 1402 is moved to the left side of the sample 103 in FIG. 17B. That is, the field of view of the camera 109 can be controlled by inclining the surface of the sample 103 by the inclination adjustment unit 1600.

The control of the field of view is not limited to inclining the surface of the sample. For example, the field of view may be controlled by moving or inclining at least a part of the objective lens. In addition, the field of view may be controlled by moving the camera.

The four embodiments of the photoelectron emission microscope according to the invention are described above. The photoelectron emission microscope according to the invention is not limited to the above embodiments, and can be embodied by modifying elements without departing from the gist of the invention. In addition, a plurality of elements disclosed in the above embodiments may be appropriately combined. Further, several elements may be omitted from all the elements shown in the above embodiments.

REFERENCE SIGNS LIST

101: excitation light source
102: optical path
103: sample
104: irradiation position adjustment unit
105: excitation light irradiation position
106: sample stage
107: objective lens
108: magnifying lens
109: camera
110: deflector
112: vacuum chamber
113: device body
114: input and output unit
115: control unit
116: storage unit
201: photoelectron
202: field of view
203: field of view
300: detection surface
301: trajectory
302: trajectory
303: trajectory
304: trajectory
311: photoelectron image
312: photoelectron image
313: photoelectron image
314: photoelectron image
320: position
401: field of view
402: bright pattern
403: dark pattern
404: excitation light irradiation position
405: objective lens central axis
601: condition selection unit
602: excitation light condition selection unit
603: electron optical system condition selection unit
604: camera condition selection unit
605: allowable error setting unit
606: preset button
607: adjustment start button
608: photoelectron image display unit
609: fine adjustment unit
610: parameter adjustment unit
611: field-of-view adjustment unit
612: excitation light irradiation position adjustment unit
613: wobbling button
614: condition storage button
800: luminance distribution
801: horizontal direction profile
802: vertical direction profile
901: dividing line
1001: circular pattern
1100: height sensor
1300: reference height
1301: excitation light
1302: excitation light
1303: objective lens central axis
1400: height adjustment unit
1600: inclination adjustment unit

The invention claimed is:

1. A photoelectron emission microscope comprising:
a sample stage on which a sample is to be placed;
an excitation light source configured to irradiate the sample with excitation light;
a camera configured to detect photoelectrons emitted from the sample and capture a photoelectron image;
an objective lens configured to focus the photoelectrons on a detection surface of the camera; and
a control unit configured to control each unit, wherein
the control unit aligns, based on a luminance distribution of a first photoelectron image, a field-of-view center of the camera with an irradiation position of the excitation light, and aligns, based on a second photoelectron image and a third photoelectron image that are captured by changing a lens intensity of the objective lens, the field-of-view center with a central axis of the objective lens.

2. The photoelectron emission microscope according to claim 1, wherein
the control unit calculates the irradiation position of the excitation light based on a one-dimensional profile created by integrating the luminance distribution of the first photoelectron image in one direction.

3. The photoelectron emission microscope according to claim 1, wherein
the control unit divides the first photoelectron image into a plurality of regions, and compares sums of luminance calculated for each of the divided regions so as to obtain a direction in which the irradiation position of the excitation light is present.

4. The photoelectron emission microscope according to claim 1, further comprising:
a height sensor configured to measure a height of the sample, wherein
the control unit adjusts the irradiation position of the excitation light based on a measurement result of the height sensor.

5. The photoelectron emission microscope according to claim 1, further comprising:
a height sensor configured to measure a height of the sample; and
a height adjustment unit configured to adjust a height of the sample stage, wherein the control unit controls the height adjustment unit such that the height of the sample is a reference height that is a predetermined height.

6. The photoelectron emission microscope according to claim 1, wherein
the control unit adjusts the field-of-view center by controlling a deflector configured to deflect a trajectory of the photoelectrons.

7. The photoelectron emission microscope according to claim 1, wherein
the control unit adjusts the field-of-view center by controlling an inclination adjustment unit configured to adjust an inclination of the sample stage.

8. The photoelectron emission microscope according to claim 1, wherein
the control unit adjusts the field-of-view center by controlling a lens position adjustment unit configured to move or incline at least a part of the objective lens.

9. The photoelectron emission microscope according to claim 1, wherein
the control unit adjusts the field-of-view center by controlling a camera position adjustment unit configured to move the camera.

10. The photoelectron emission microscope according to claim 1, wherein
the control unit adjusts the irradiation position of the excitation light by controlling a mirror adjustment unit configured to move or incline a mirror that reflects the excitation light.

11. The photoelectron emission microscope according to claim 1, wherein
the control unit adjusts the irradiation position of the excitation light by controlling a light source position adjustment unit configured to move or incline the excitation light source.

* * * * *